US012303792B2

(12) United States Patent
Silverstein et al.

(10) Patent No.: US 12,303,792 B2
(45) Date of Patent: May 20, 2025

(54) MULTIPLAYER E-GAMING IMPORTABLE CONTROLS AND SETTINGS

(71) Applicant: INTERNATIONAL BUSINESS MACHINES CORPORATION, Armonk, NY (US)

(72) Inventors: Zachary A. Silverstein, Georgetown, TX (US); Logan Bailey, Atlanta, GA (US); Jeremy R. Fox, Georgetown, TX (US); Tyler Hansen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 18/188,014

(22) Filed: Mar. 22, 2023

(65) Prior Publication Data

US 2024/0316465 A1 Sep. 26, 2024

(51) Int. Cl.
*A63F 13/79* (2014.01)
*A63F 13/20* (2014.01)
(52) U.S. Cl.
CPC .............. *A63F 13/79* (2014.09); *A63F 13/20* (2014.09)
(58) Field of Classification Search
None
See application file for complete search history.

(56) References Cited

U.S. PATENT DOCUMENTS

| | | | |
|---|---|---|---|
| 9,565,263 B2 | 2/2017 | Lin | |
| 9,636,586 B2 | 5/2017 | Allen | |
| 9,891,741 B2 | 2/2018 | Huang | |
| 2007/0066403 A1 | 3/2007 | Conkwright | |
| 2011/0118022 A1* | 5/2011 | Aronzon | A63F 13/235 463/43 |
| 2011/0136568 A1* | 6/2011 | Buhr | A63F 13/22 463/37 |
| 2020/0316463 A1* | 10/2020 | Itay | A63F 13/31 |
| 2021/0379487 A1 | 12/2021 | Huffer | |
| 2022/0134220 A1* | 5/2022 | Dang | A63F 13/35 463/37 |

FOREIGN PATENT DOCUMENTS

CN 111921186 A 11/2020

OTHER PUBLICATIONS

IBM Cloud, "Next-Level Gaming with IBM Cloud," IBM [online], May 4, 2020 [accessed on Jan. 11, 2023], 4 pages, Retrieved from the Internet: <URL: https://www.ibm.com/cloud/blog/next-level-gaming-with-ibm-cloud>.

(Continued)

*Primary Examiner* — Jason T Yen
(74) *Attorney, Agent, or Firm* — Robert D. Bean

(57) ABSTRACT

According to one embodiment, a method, computer system, and computer program product for importing player settings is provided. The present invention may include requesting one or more player settings responsive to receiving a command from a user to import one or more player settings associated with a player; receiving the one or more player settings; performing a hardware check to determine if the player settings are compatible with one or more user hardware elements; overwriting one or more user settings with the revised player settings based on the hardware check; and displaying a message to the user with one or more results of the overwrite.

20 Claims, 4 Drawing Sheets

(56) References Cited

OTHER PUBLICATIONS

IBM Developer, "Gaming," IBM [online], Dec. 2, 2021 [accessed on Jan. 11, 2023], 4 pages, Retrieved form the Internet: <URL: https://developer.ibm.com/industries/gaming/>.

IBM Mediacenter, "Virtual gaming with IBM Cloud," IBM [online], Jun. 13, 2018 [accessed on Jan. 11, 2023], 15 pages, Retrieved from the Internet: <URL: https://mediacenter.ibm.com/media/Virtual+gaming+with+IBM+Cloud/0_9dge7nfd>.

* cited by examiner

MULTIPLAYER E-GAMING IMPORTABLE CONTROLS AND SETTINGS

BACKGROUND

The present invention relates, generally, to the field of computing, and more particularly to human-computer interaction.

The field of human-computer interaction concerned with the hardware and software elements by which a human being interacts with a machine, such as a computer. The goal of such interaction is to enable effective operation and control of the machine by a human user, while the machine simultaneously provides information back to the user to facilitate the decision-making processes of the user. Generally, the goal of the field of human-computer interaction is to produce and refine the interface between the human user and the computer to improve the ease, efficiency, user-friendliness, and enjoyability with which a user interacts with the computer, while simultaneously enabling the computer to operate in a way which produces the desired result in response to user inputs; in practical terms, this typically entails minimizing the inputs that a human user must provide to achieve the desired output, and minimizing undesired outputs from the machine to the human user. Human-computer interaction is a more important field than ever as computers become ever more widespread in use, and its precepts can be applied in a wide variety of computing contexts including computerized vehicles and appliances, internet browsing, gaming, mixed-reality, and more.

Keybinding is a concept associated with human-computer interaction comprising the practice of mapping one or more user inputs, often corresponding with an individual physical button, key, or other interface element, to one or more actions by a computer, such as invoking a software program or performing a preprogrammed action. Such a mapped input-action pair is referred to as a "hotkey." A keybinding may comprise a number of hotkeys and may refer to general suite of hotkeys associated with a given software program, game, operating system, user profile, et cetera. Hotkeys enable a user to execute operations that would otherwise be accessible only through a menu, a pointing device, different levels of a user interface, or via a command-line interface. Hotkeys are generally used to expedite common operations by reducing input sequences to a few keystrokes, hence the term "shortcut." To differentiate from ordinary input, most hotkeys require the user to press and hold several keys simultaneously, or a sequence of keys one after the other. Unmodified key presses are sometimes accepted when the interface element is not used for general input, for example where the action is mapped to a function key on a keyboard which performs no action by default, but which is dedicated for use in shortcuts and may only require a single keypress. In fast-paced computing contexts such as gaming, programming, mixed-reality, et cetera, keybinding and human-computer interfacing in general offer critical boosts to the ease and efficiency with which a user translates their inputs into computer action, where the time saved can mean the difference between success or failure.

SUMMARY

According to one embodiment, a method, computer system, and computer program product for importing player settings is provided. The present invention may include requesting one or more player settings responsive to receiving a command from a user to import one or more player settings associated with a player; receiving the one or more player settings; performing a hardware check to determine if the player settings are compatible with one or more user hardware elements; overwriting one or more user settings with the revised player settings based on the hardware check; and displaying a message to the user with the results of the overwrite.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
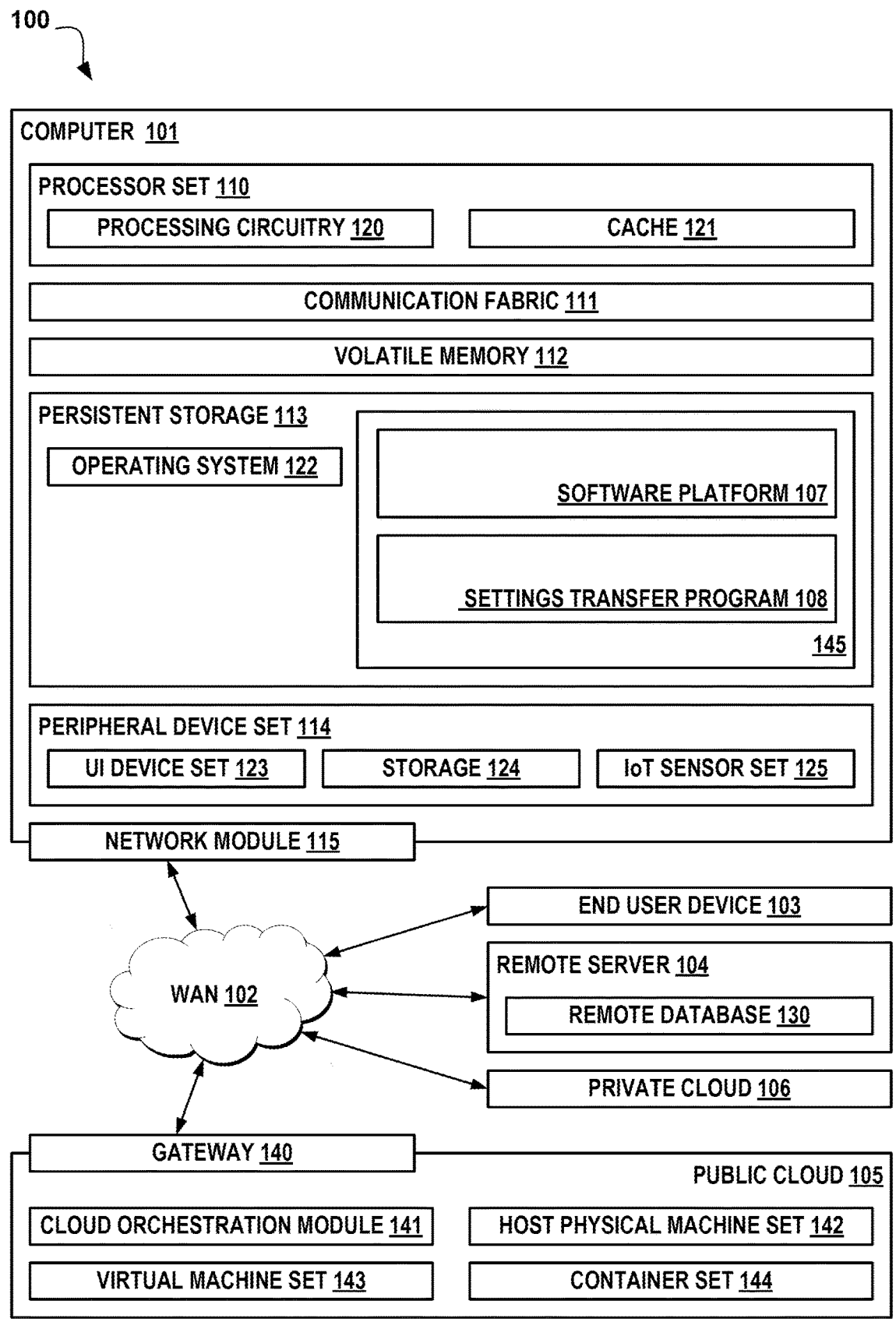
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to human-computer interaction. The following described exemplary embodiments provide a system, method, and program product to, among other things, enable a user to request and obtain settings, comprising keybindings, from a multiplayer gaming platform or streaming platform, and import the obtained settings in the local gaming client of the user.

As previously described, keybinding is the practice of mapping one or more user inputs, often corresponding with an individual physical button, key, or other interface element, to one or more actions by a computer, such as invoking a software program or performing a preprogrammed action. In the context of gaming, all in-game actions, from moving a character to interacting with the game world to issuing commands to units, may be mapped to different keys or other interface elements, and may further be customizable, such that a user may change the individual mappings to the user's preference, and bind program functions to a different set of keystrokes instead of or in addition to the default. This is a useful feature in that oftentimes the default keybinding is insufficient for a given user for a variety of reasons; for example, the default keybinding may not take into account the particular hardware setup and interface options of a given user, may be poorly designed such that, for example, keys tied to important actions are difficult to reach, may be unintuitive to a user because, for example, the user is acclimated and has developed muscle memory for a different keybinding, et cetera. Furthermore, in this era of streaming and constant digital connection, users may be playing with or watching friends, teammates, and internet personalities and may wish to play as they do and import their keybindings, because other players may have developed more efficient keybindings than the default, may possess similar interface options or may have developed similar muscle memory to the user. However, short of asking another player for their keybindings and manually changing each hotkey, this is largely impossible.

Several games and game plug-ins offer "streamer mode" features, such as displaying a historical list of the abilities used in the game by a streamer to viewers of the corresponding stream; this list is meant for viewer instructional purposes, but is insufficient for the purposes of allowing a user to play like the streamer in that it fails to display corresponding key bindings for the abilities. To enable copying of keybindings, a streamer might have to maintain a list of each ability, its placement on the screen, and the "keybinding" associated. This list would need to be manually maintained each time a change is made, and manually updated by any players using the list. In some cases, streamers may include a visual overlay of the controller they're using which displays the button/trigger presses performed by the streamer to viewers of the stream. However, in order to use this overlay in a helpful way, a viewer would first need to closely watch the overlay and screen actions to discern which buttons perform which actions. Such a method is slow, inefficient, error-prone, and frustrating.

Furthermore, a game may possess a number of settings, which may include interface settings, graphical settings, et cetera. Interface settings may, for example, allow the user to control the field of view displayed to the user, what graphical user interface elements are displayed to the user during the game, how a player character controls, mouse sensitivity, et cetera. Interface settings may comprise the keybindings. Graphical settings may allow a user to control different visual qualities of the game interface and world, such as resolution, visual effects, film grain, brightness, motion blur, depth of field, lens flare, shadow and water fidelity, et cetera, as well as select software rendering techniques to apply such as anti-aliasing, post-processing, texture filtering, et cetera. Interface settings may have a marked effect on gameplay; for example, a user who has increased their field of view in the interface settings may be able to see more of the world around them, providing a noticeable advantage over players with default or lesser fields of view. Likewise, graphical settings have a significant impact on the resource usage of the game; a high resource usage may result in lag, latency, crashing, and other various degradations of computer performance which may seriously affect gameplay. As such, there may be certain combinations of settings that produce great improvements in gameplay and performance. However, many settings are unintuitive and defy understanding by most players; the practical effect that 16× anisotropic texture filtering has on gameplay may defy casual understanding. Consequently, for any given game, a player may have to do research to find the effect of various settings and choose a desired combination. This is difficult and time consuming.

As such, it may be advantageous to, among other things, implement a system that interfaces with a game and/or streaming platform to enable a user to instantly import settings and/or keybindings from a player or streamer. Therefore, the present embodiment has the capacity to improve the technical field of human-computer interaction by addressing interface inefficiency caused by flawed default settings and keybindings, providing a technical means to enable a user to quickly and easily import setting configurations and keybindings that can improve the performance of the user's computing setup, improve the interface efficiency between the user and the computer, and improve user's speed, efficiency, immersion, and enjoyment of interactive software programs such as games, development interfaces, mixed-reality experiences, et cetera.

According to one embodiment, the invention is a system and method to allow streaming and multiplayer gaming platforms to provide settings, including keybindings, to a requesting user.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method, and program product to enable a user to request and obtain settings, comprising keybindings, from a multiplayer gaming platform or streaming platform, and import the obtained settings in the local gaming client of the user.

Referring now to FIG. 1, computing environment 100 contains an example of an environment for the execution of at least some of the computer code involved in performing the inventive methods, such as code block 145, which may comprise one or more software platforms 107 and settings transfer program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the software platform 107 may comprise two or more discrete software programs which may be located on separate machines, but which are networked such that they are capable of communicating with each other, and which are designed to interoperate with each other to carry out a function. For example, software program 107 may comprise a streaming platform, which may comprise a server and one or more clients; the streaming platform may receive streamed media at the server from one or more clients and may transmit that streamed media in real time to one or more clients. Additionally or alternatively, the software platform 107 may comprise a multiplayer gaming platform, which may comprise a server and one or more clients, for example corresponding to players of the game, where the server receives information on a local game state from each of a number of clients participating in a game, fuses the received local game states into an overall game state, and communicates the overall game state to each participating client. In embodiments of the invention, the software platform 107 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, software platform 107 may be distributed in its operation over any number or combination of the aforementioned devices.

According to the present embodiment, the settings transfer program 108 may be a program configured to enable a user to request and obtain settings, comprising keybindings, from a multiplayer gaming platform or streaming platform, and import the obtained settings in the local gaming client of the user. The settings transfer program 108 may, when executed, cause the computing environment 100 to carry out a settings transfer process 200. The settings transfer process 200 may be explained in further detail below with respect to FIG. 2. In embodiments of the invention, the settings transfer program 108 may be a subcomponent of, integrated with, called by, or otherwise in communication and interoperable with one or more software platforms 107. In embodiments of the invention, the settings transfer program 108 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, settings transfer program 108 may be distributed in its operation over any number or combination of the aforementioned devices.

Figure 2:
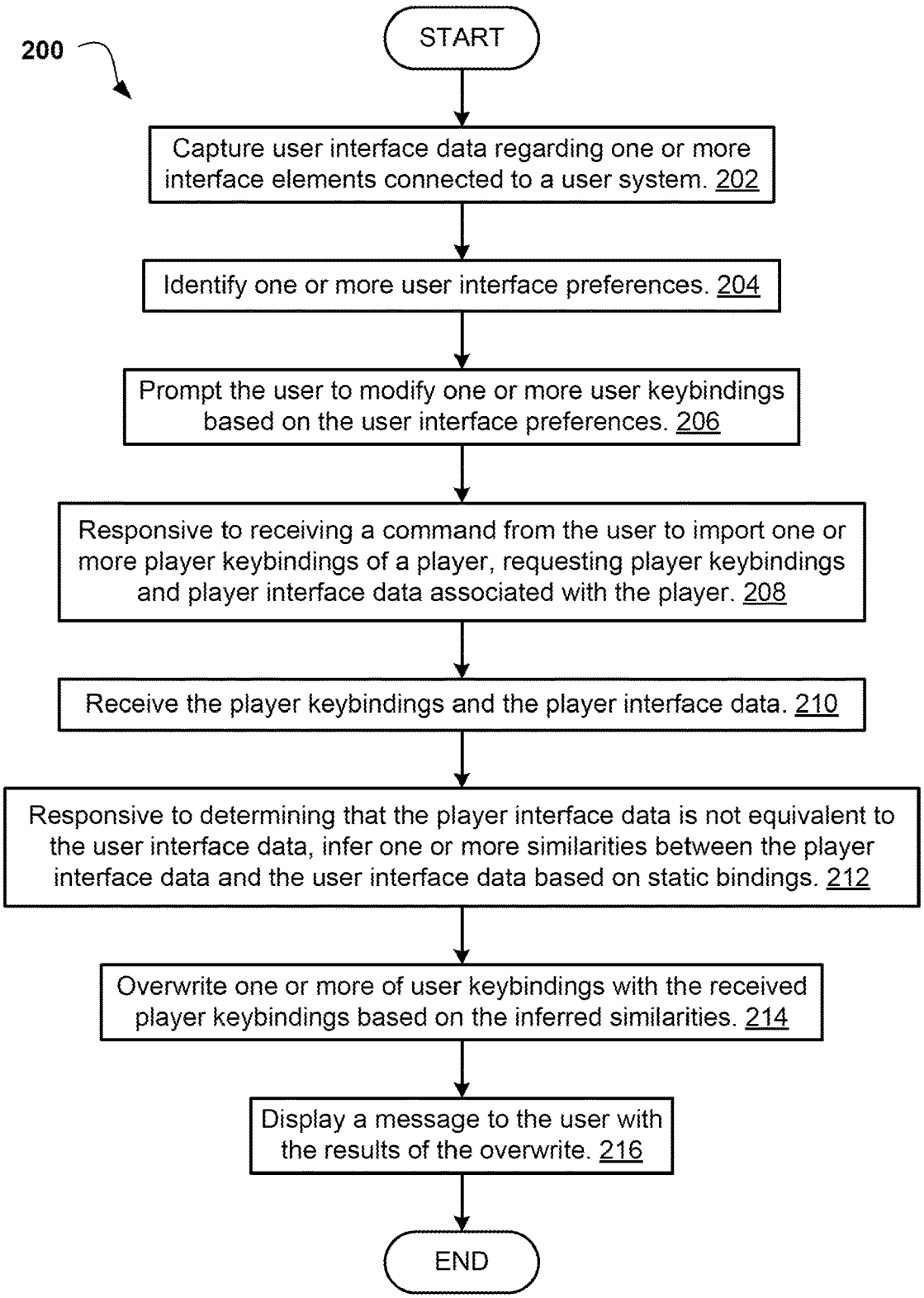
FIG. 2 is an operational flowchart illustrating a settings transfer process according to at least one embodiment.

Referring now to FIG. 2, an operational flowchart illustrating a settings transfer process 200 is depicted according to at least one embodiment. At 202, the settings transfer program 108 may capture user interface data regarding one or more interface elements connected to an end user device 103. Here, the settings transfer program 108 may analyze the user device 103 to identify connected interface devices through which the user may interact with the user device 103. Interface devices, or interface elements, may include computer-integrated devices such as laptop keyboards or trackpads, peripheral devices such as video game controllers, attached keyboards, attached mice, joysticks, and any other dedicated input devices, which may comprise various input means such as buttons, keys, analog sticks, triggers, touchscreens, et cetera. In some embodiments, interface elements may comprise microphones and cameras, through which a user may provide speech and gesture inputs, respectively. The settings transfer program 108 may identify connected devices by searching for interface devices connected with the user device 103 and comparing found devices against a pre-provided list of known devices and associated technical specifications, which may include the number, location, type, relative position, axis of motion, et cetera regarding the input means comprising a given interface device.

At 204, the settings transfer program 108 may identify one or more user interface preferences. Here, the settings transfer program 108 may search for and retrieve keybindings from one or more games installed on the user device. In some embodiments of the invention, the settings transfer program 108 may look up actions associated with the keybindings, for example by searching a pre-provided list or database associated with the respective games. The settings transfer program 108 may group retrieved keybindings based on the genre of the game from which they were retrieved; for example, keybindings from platforming games may be grouped separately from first-person games, which may be grouped separately from keybindings from real-time strategy games. In some embodiments, the settings transfer program 108 may utilize machine learning to infer whether actions from games of the same genre are equivalent between other games of that genre. The settings transfer program 108 may, based on the output of the machine learning model, identify whether equivalent actions are mapped to the same user input. If a pattern is identified, the settings transfer program 108 may prompt the user to modify one or more user keybindings to conform to the pattern.

At 206, the settings transfer program 108 may prompt the user to modify one or more user keybindings based on the user interface preferences. In some embodiments, the settings transfer program 108 may prompt the user in response to the user installing a new game, creating a new account for a game, playing a new game for the first time, when a pattern in user keybindings is discovered, et cetera. Where, for example, two or more equivalent actions in other games of the same genre as a new game are mapped to the same key, the settings transfer program 108 may prompt the user to change the keybinding for the equivalent action of the new game to match the same key to which the equivalent action in the other games are mapped. In an exemplary instance, the settings transfer program 108 may identify that two games installed on the user device 103 and defined as belonging to a "platformer" genre have actions titled "jump," both of which are mapped to the spacebar. Upon detecting that the user has recently installed, opened, and/or played a game, the settings transfer program 108 may determine a genre associated with that game by querying, for example, an online gaming service hosting the game, or the user; upon discovering that this game belongs to the platformer genre, and has an action labeled "jump" which is mapped to the ctrl key, the settings transfer program 108 may prompt the user to allow settings transfer program 108 to automatically change the jump hotkey from the ctrl key to the spacebar, thereby maintaining consistency in user actions and associated controls. The settings transfer program 108 may prompt the user by, for example, operating a display device to render a graphical element such as a popup text box, push notification, image, animation, video, et cetera on a display associated with user device 103. Responsive to the user accepting the prompt, the settings transfer program 108 may modify the keybindings of the new game to match those of previous installed, played, and/or opened games.

At 208, the settings transfer program 108 may, responsive to receiving a command from the user to import one or more player keybindings of a player, request player keybindings and player interface data associated with the player. Here, the software platform 107 may comprise some means of enabling a user to request keybindings of a particular player; for example, in the context of a gaming platform, a button or other interactable graphical element may be displayed over a player during the game, within a profile or menu associated with that player, next to a list of recently encountered players, et cetera. In another example, in the context of a streaming platform, a button or other interactable graphical element may be overlaid onto the stream, displayed in a menu near the stream, within a menu accessible from the stream, et cetera, where the button or other interactable graphical element may be associated with the player who is streaming the game. The button or other interactable graphical element may, upon being clicked or otherwise engaged with by the user, send a command, for example to a server 104 or other such remote service or program, to transmit the keybindings that that player is using while playing the game that the user is currently playing or watching a stream of, to the user device 103.

At 210, the settings transfer program 108 may receive the player keybindings and the player interface data. Here, the settings transfer program 108 may receive, for example from a server 104 or other such remote service or program, keybindings that the user-initiated transmission of by interacting with the interactable graphical element. The settings transfer program 108 may also receive player interface data, which may be information regarding the interface devices connected to the system used by the player from which the keybindings were retrieved, and which were used by the player to play the game, as well as the various input means that may comprise them.

At 212, the settings transfer program 108 may, responsive to determining that the player interface data is not equivalent to the user interface data, infer one or more similarities between the player interface data and the user interface data based on static bindings. The settings transfer program 108 may determine that the player interface data is not equivalent by comparing the user interface data with the player interface data; if the interface devices comprising the user interface data match one or more of the interface devices comprising the player interface data, than the corresponding interface data is equivalent. However, if no interface devices comprising the user interface data do not match any interface devices of the player interface data, then the respective interface data is not equivalent; in such embodiments, the settings transfer program 108 may analyze the position, type, arrangement, et cetera of input means of the respective interface devices comprising the user interface data and the player interface data, to infer whether an input means or group of input means on respective input devices are similar, such that mapping the player keybindings to the user's keybindings would still be possible. For instance, if a player's system comprises an official gamestation controller, which the player uses to play the game, but the user plays the game on a third-party mad dogz controller, then the settings transfer program 108 may not consider the player interface data and the user interface data to be equivalent, because the gamestation controller is not the same as the mad dogz controller. However, the settings transfer program 108 may analyze the input means and find that while the dimensions and button placement of the two controllers are not identical, they both possess a grouping of four buttons on the right side and an analog stick on the left side; in such a scenario, the settings transfer program 108 may infer that the two controllers are similar, and may proceed with mapping the player keybindings to the user's game. In some embodiments, for example where settings transfer program 108 operates or is in communication with a camera sensor, settings transfer program 108 may prompt the user to utilize the camera to obtain images of one or more peripherals that do not match; the settings transfer program 108 may use visual processing and machine learning techniques to identify input means on the surface of the controller for the purpose of inferring similarities.

At 214, the settings transfer program 108 may overwrite one or more user keybindings with the received player keybindings based on the inferred similarities. Here, the settings transfer program 108 may interface with the game, for example using an API, to modify the keybindings of the game to replace the keybindings with those corresponding to the player. In some embodiments, settings transfer program 108 may only replace keybindings pertaining to matching or similar interface devices. In some embodiments, the settings transfer program 108 may prompt the user to inform the user of the similarities and request user authorization to overwrite the user keybindings with the player keybindings that correspond to the inferred similarities. In some embodiments, for example where settings transfer program 108 can identify no equivalent keybindings and no inferred similarities, the settings transfer program 108 may prompt the user to manually enter the keybindings, or to authorize the overwriting of one or more keybindings.

At 216, the settings transfer program 108 may display a message to the user with the results of the overwrite. Here, the settings transfer program 108 may display a graphical element on a digital display device associated with user device 103. The graphical element may comprise a written message which may include suggestions for using the newly imported player keybindings, and/or any changes from a previous revision of the player keybindings previously received that were associated with the same player.

Figure 3:
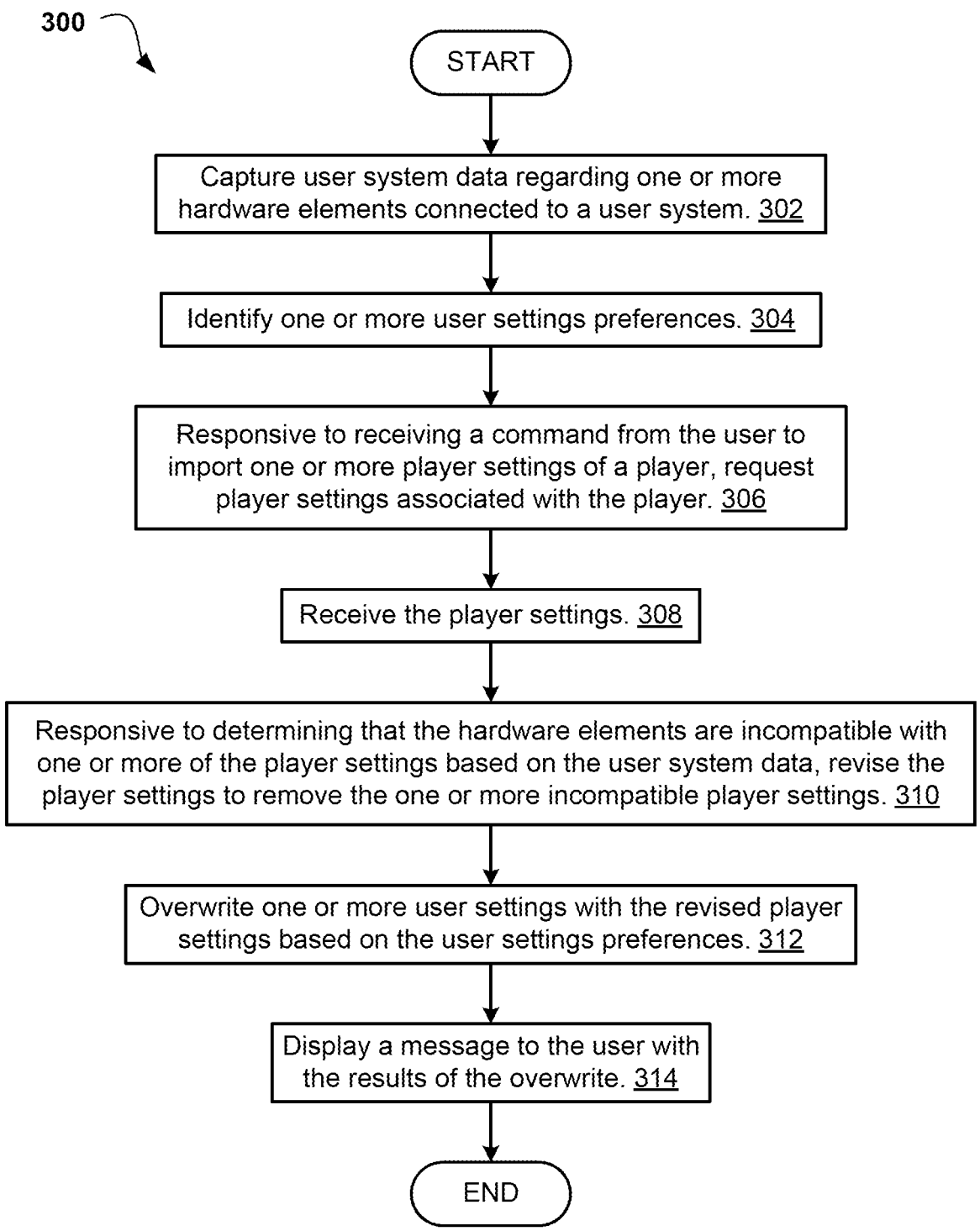
FIG. 3 is an operational flowchart illustrating a settings transfer process according to at least one embodiment.

Referring now to FIG. 3, an operational flowchart illustrating a settings transfer process 300 is depicted according to at least one embodiment. At 302, the settings transfer program 108 may capture user system data regarding one or more system elements connected to a user system 103. Here, the settings transfer program 108 may analyze the user device 103 to identify its component parts that drive the performance of user device 103 in running the game, such as central processing units, graphical processing units, random access memory, display devices, et cetera. The settings transfer program 108 may further retrieve statistics relating to the performance of identified component parts, such as the number and speed of cores comprising a central processing unit, the amount and speed of random access memory, the architecture and performance of a graphical processing unit, the native resolution of a display, et cetera, for example by looking up the identified component parts in a list comprising a number of parts and their associated performance statistics.

At 304, the settings transfer program 108 may identify one or more user settings preferences. Here, the settings transfer program 108 may identify one or more settings that a user may never want to import, and/or one or more settings that a user may always want to import. For example, a user may always want to import settings corresponding to lens flare, motion blur, shadow quality, and water quality, because such settings may have a large impact on performance from game to game, but the user may never want to import effects quality, because the user loves effects and always wants them set to the highest level regardless of the potential impact on performance. The settings transfer program 108 may identify the user preferences by prompting the user to submit settings selections, and/or by consulting a pre-provided list of user preferences, and/or by crawling user preferences from other games, software platforms 107, devices, data repositories, services, et cetera. In the present example, the settings may not comprise keybindings.

At 306, the settings transfer program 108 may, responsive to receiving a command from the user to import one or more player settings of a player, request player settings associated with the player. Here, the software platform 107 may comprise some means of enabling a user to request settings of a particular player; for example, in the context of a gaming platform, a button or other interactable graphical element may be displayed over a player during the game, within a profile or menu associated with that player, next to a list of recently encountered players, et cetera. In another example, in the context of a streaming platform, a button or other interactable graphical element may be overlaid onto the stream, displayed in a menu near the stream, within a menu accessible from the stream, et cetera, where the button or other interactable graphical element may be associated with the player who is streaming the game. The button or other interactable graphical element may, upon being clicked or otherwise engaged with by the user, send a command, for example to a server 104 or other such remote service or program, to transmit the settings that that player is using while playing the game that the user is currently playing or watching a stream of, to the user device 103.

At 308, the settings transfer program 108 may receive the player settings. Here, the settings transfer program 108 may receive, for example from a server 104 or other such remote service or program, player settings that the user-initiated transmission of through interacting with the interactable graphical element.

At 310, the settings transfer program 108 may, responsive to determining that the system elements are incompatible with one or more of the player settings based on the user system data, revise the player settings to remove the one or more incompatible player settings. The settings transfer program 108 may identify that system elements are incompatible with a given setting of the player settings where the setting exceeds the performance capabilities of the system elements, for example where a setting enables ray tracing but the graphical processing unit of the user device 103 does not support ray tracing. In some embodiments, the settings transfer program 108 may initiate a performance check, wherein settings transfer program 108 models the effect that one or more settings of the user settings would have on the user device's 103 ability to render the game, as measured by frames per second, latency, lag, et cetera; if any or a combination of such metrics fall below a performance threshold, than such one or more settings may be considered to be incompatible. The performance threshold may represent the threshold below which the gameplay experience will be significantly degraded, and may be pre-provided by the user, or may be a default threshold formulated based on aggregate information from other players. In an example where a setting raises the graphics to ultra but the graphical processing unit is unequal to the task, resulting in frames per second of the game dipping below a performance threshold where visual quality and gameplay become noticeably degraded, settings transfer program 108 may label such setting as incompatible with the user device 103. The settings transfer program 108 may then revise the player settings to delete incompatible player settings, leaving only player settings that are compatible with user device 103.

At 312, the settings transfer program 108 may overwrite one or more user settings with the revised player settings based on the user settings preferences. Here, the settings transfer program 108 may interface with the game, for example using an API, to modify the settings of the game to replace the settings with those corresponding to the player. In some embodiments, settings transfer program 108 may only replace settings that the user has designated should always be replaced and may exclude settings which the user has designated as never replace in the user setting preferences. In some embodiments, the settings transfer program 108 may only modify the settings of the game to replace the user settings with player settings that are compatible with the one or more system elements, and may exclude player settings that are incompatible, for example by replacing the user settings with player settings that have been revised to exclude incompatible player settings.

At 314, the settings transfer program 108 may display a message to the user with the results of the overwrite. Here, the settings transfer program 108 may display a graphical element on a digital display device associated with user device 103. The graphical element may comprise a written message which may include suggestions for using the newly imported player settings, and/or any changes from a previous revision of the player settings previously received that were associated with the same player.

Figure 4:
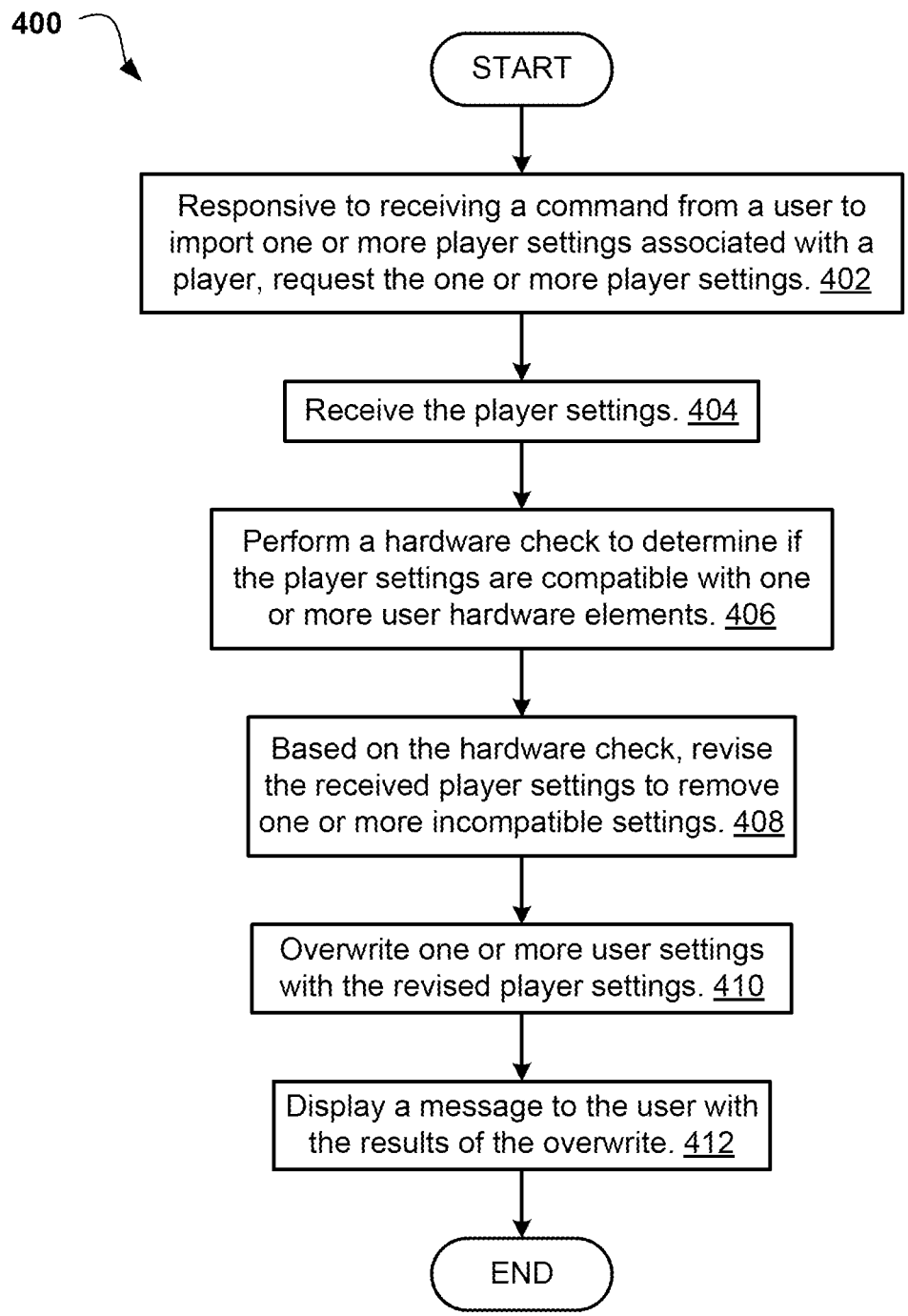
FIG. 4 is an operational flowchart illustrating a settings transfer process according to at least one embodiment.

Referring now to FIG. 4, an operational flowchart illustrating a settings transfer process 400 is depicted according to at least one embodiment. At 402, the settings transfer program 108 may, responsive to receiving a command from a user to import one or more player settings associated with a player, request the one or more player settings. In this embodiment, the settings may or may not comprise keybindings. Here, the software platform 107 may comprise some means of enabling a user to request settings of a particular player; for example, in the context of a gaming platform, a button or other interactable graphical element may be displayed over a player during the game, within a profile or menu associated with that player, next to a list of recently encountered players, et cetera. In another example, in the context of a streaming platform, a button or other interactable graphical element may be overlaid onto the stream, displayed in a menu near the stream, within a menu accessible from the stream, et cetera, where the button or other interactable graphical element may be associated with the player who is streaming the game. The button or other interactable graphical element may, upon being clicked or otherwise engaged with by the user, send a command, for example to a server 104 or other such remote service or program, to transmit the settings that that player is using while playing the game that the user is currently playing or watching a stream of, to the user device 103.

At 404, the settings transfer program 108 may receive the player settings. Here, the settings transfer program 108 may receive, for example from a server 104 or other such remote service or program, player settings that the user-initiated transmission of by interacting with the interactable graphical element.

At 406, the settings transfer program 108 may perform a hardware check to determine if the player settings are compatible with one or more user hardware elements. Here, the hardware check may comprise gathering, by settings transfer program 108, user system data regarding one or more system elements connected to a user system 103. Here, the settings transfer program 108 may analyze the user device 103 to identify its component parts that drive the performance of user device 103 in running the game, such as central processing units, graphical processing units, random access memory, display devices, et cetera.

The settings transfer program 108 may further retrieve statistics relating to the performance of identified component parts, such as the number and speed of cores comprising a central processing unit, the amount and speed of random access memory, the architecture and performance of a graphical processing unit, the native resolution of a display, et cetera, for example by looking up the identified component parts in a list comprising a number of parts and their associated performance statistics. The settings transfer program 108 may identify that system elements are incompatible with a given setting of the player settings where the setting exceeds the performance capabilities of the system elements, for example where a setting enables ray tracing but the graphical processing unit of the user device 103 does not support ray tracing.

In some embodiments of the invention, the hardware check may comprise a performance check, wherein the settings transfer program 108 models the effect that one or more settings of the player settings would have on the user device's 103 ability to render the game, as measured by frames per second, latency, lag, et cetera; if any or a combination of such metrics fall below a performance threshold, than the player setting causing the performance effect may be considered to be incompatible. The performance threshold may represent the threshold below which the gameplay experience will be significantly degraded, and may be pre-provided by the user, or may be a default threshold formulated based on aggregate information from other players. In an example where a setting raises the graphics to ultra but the graphical processing unit is unequal to the task, resulting in frames per second of the game dipping below a performance threshold where visual quality and gameplay become noticeably degraded, settings transfer program 108 may label such setting as incompatible with the user device 103. The settings transfer program 108 may then revise the player settings to delete incompatible player settings, leaving only player settings that are compatible with user device 103.

Alternatively, or additionally, for example where the player settings comprise keybindings, the hardware check may comprise analyzing, by settings transfer program 108, the user device 103 to identify connected interface devices through which the user may interact with the user device 103. Interface devices, or interface elements, may include computer-integrated devices such as laptop keyboards or trackpads, peripheral devices such as video game controllers, attached keyboards, attached mice, joysticks, and any other dedicated input devices, which may comprise various input means such as buttons, keys, analog sticks, triggers, touchscreens, et cetera. In some embodiments, interface elements may comprise microphones and cameras, through which a user may provide speech and gesture inputs, respectively. The settings transfer program 108 may identify connected devices by searching for interface devices connected with the user device 103 and comparing found devices against a pre-provided list of known devices and associated technical specifications, which may include the number, location, type, relative position, axis of motion, et cetera regarding the input means comprising a given interface device, which may be stored as user interface data. The settings transfer program 108 may, responsive to determining that the player settings comprise keybindings, request player interface data from the player. Responsive to receiving the requested player interface data, the settings transfer program 108 may match the requested player interface data against the user interface data; if a peripheral in the player interface data matches a peripheral in the user interface data, such that the peripherals have identical or nearly identical input means, the settings transfer program 108 may consider the peripherals to match. If the settings transfer program 108 fails to match a peripheral from the user interface data with a peripheral from the player interface data, the settings transfer program 108 may analyze the position, type, arrangement, et cetera of input means of the respective interface devices comprising the user interface data and the player interface data, to infer whether an input means or group of input means on respective input devices are similar, such that the layout of input means are close enough that mapping the player keybindings to the user's keybindings on the similar peripheral would still provide the user with a substantially similar control paradigm to the player.

At 408, the settings transfer program 108 may, based on the hardware check, revise the received player settings to remove one or more incompatible settings. The settings transfer program 108 may identify that system elements are incompatible with a given setting of the player settings where the setting exceeds the performance capabilities of the system elements, for example where a setting enables ray tracing but the graphical processing unit of the user device 103 does not support ray tracing. In some embodiments, the settings transfer program 108 may initiate a performance check, wherein settings transfer program 108 models the effect that one or more settings of the user settings would have on the user device's 103 ability to render the game, as measured by frames per second, latency, lag, et cetera; if any or a combination of such metrics fall below a performance threshold, than such one or more settings may be considered to be incompatible. The performance threshold may represent the threshold below which the gameplay experience will be significantly degraded, and may be pre-provided by the user, or may be a default threshold formulated based on aggregate information from other players. In an example where a setting raises the graphics to ultra but the graphical processing unit is unequal to the task, resulting in frames per second of the game dipping below a performance threshold where visual quality and gameplay become noticeably degraded, settings transfer program 108 may label such setting as incompatible with the user device 103. The settings transfer program 108 may then revise the player settings to delete incompatible player settings, leaving only player settings that are compatible with user device 103.

At 410, the settings transfer program 108 may overwrite one or more user settings with the revised player settings. Here, the settings transfer program 108 may interface with the game, for example using an API, to modify the settings of the game to replace the settings with those corresponding to the player. In some embodiments, settings transfer program 108 may only replace settings that the user has designated should always be replaced and may exclude settings which the user has designated as never replace in the user setting preferences. In some embodiments, the settings transfer program 108 may only modify the settings of the game to replace the user settings with player settings that are compatible with the one or more system elements, and may exclude player settings that are incompatible, for example by replacing the user settings with player settings that have been revised to exclude incompatible player settings.

At 412, the settings transfer program 108 may display a message to the user with the results of the overwrite. Here, the settings transfer program 108 may display a graphical element on a digital display device associated with user device 103. The graphical element may comprise a written message which may include suggestions for using the newly imported player settings, and/or any changes from a previous revision of the player settings previously received that were associated with the same player.

It may be appreciated that FIGS. 2-4 provide only illustrations of individual implementations and do not imply any limitations with regard to how different embodiments may be implemented. One skilled in the art would understand embodiments and aspects of any of FIGS. 2-4 to be applicable to and combinable with the others.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for importing player settings, the method comprising:
   responsive to receiving a command from a user to import one or more player settings associated with a player, requesting the one or more player settings;
   receiving the one or more player settings;
   performing a hardware check to determine if the player settings are compatible with one or more user hardware elements;
   overwriting one or more user settings with the revised player settings based on the hardware check; and
   displaying a message to the user with one or more results of the overwrite.

2. The method of claim 1, wherein performing the hardware check further comprises:
   responsive to determining that a player peripheral associated with one or more of the player settings does not match a user peripheral, removing one or more keybindings associated with the player peripheral from the player settings.

3. The method of claim 1, wherein performing the hardware check further comprises:
   responsive to determining that a player peripheral associated with one or more of the player settings does not match a user peripheral, identifying one or more similarities between the player peripheral and the user peripheral based on a static mapping; and
   removing one or more keybindings associated with the player peripheral which do not correspond to the identified similarities from the player settings.

4. The method of claim 1, wherein the overwriting is based on one or more user interface preferences, and wherein the user interface preferences are based on user keybindings from a plurality of games of a same genre on a user device.

5. The method of claim 1, wherein the hardware check comprises a performance check, comprising:
   identifying a performance impact of the user settings on a user device based on system data regarding one or more system elements connected to the user device.

6. The method of claim 1, wherein the overwriting is based on one or more user settings preferences.

7. The method of claim 1, wherein the command is received responsive to a user interacting with a button in a multiplayer gaming platform or a streaming platform.

8. A computer system for importing player settings, the computer system comprising:
   one or more processors, one or more computer-readable memories and one or more computer-readable storage media;
   program instructions, stored on at least one of the one or more storage media for execution by at least one of the one or more processors via at least one of the one or more memories, to carry out the following steps:
   responsive to receiving a command from a user to import one or more player settings associated with a player, requesting the one or more player settings;
   receiving the one or more player settings;
   performing a hardware check to determine if the player settings are compatible with one or more user hardware elements;
   overwriting one or more user settings with the revised player settings based on the hardware check; and
   displaying a message to the user with one or more results of the overwrite.

9. The computer system of claim 8, wherein the program instructions to perform the hardware check further comprise:
   responsive to determining that a player peripheral associated with one or more of the player settings does not match a user peripheral, removing one or more keybindings associated with the player peripheral from the player settings.

10. The computer system of claim 8, wherein the program instructions to perform the hardware check further comprise:
    responsive to determining that a player peripheral associated with one or more of the player settings does not match a user peripheral, identifying one or more similarities between the player peripheral and the user peripheral based on a static mapping; and
    removing one or more keybindings associated with the player peripheral which do not correspond to the identified similarities from the player settings.

11. The computer system of claim 8, wherein the program step to overwrite is based on one or more user interface preferences, and wherein the user interface preferences are based on user keybindings from a plurality of games of a same genre on a user device.

12. The computer system of claim 8, wherein the command is received responsive to a user interacting with a button in a multiplayer gaming platform or a streaming platform.

13. The computer system of claim 8, wherein the program step to overwrite is based on one or more user settings preferences.

14. The computer system of claim 8, wherein the command is received responsive to a user interacting with a button in a multiplayer gaming platform or a streaming platform.

15. A computer program product for importing player settings, the computer program product comprising:
    one or more computer-readable storage media;
    program instructions, stored on at least one of the one or more storage media, to perform the following steps:
    responsive to receiving a command from a user to import one or more player settings associated with a player, requesting the one or more player settings;
    receiving the one or more player settings;
    performing a hardware check to determine if the player settings are compatible with one or more user hardware elements;
    overwriting one or more user settings with the revised player settings based on the hardware check; and
    displaying a message to the user with one or more results of the overwrite.

16. The computer program product of claim 15, wherein the program instructions to perform the hardware check further comprise:
    responsive to determining that a player peripheral associated with one or more of the player settings does not match a user peripheral, removing one or more keybindings associated with the player peripheral from the player settings.

17. The computer program product of claim 15, wherein the program instructions to perform the hardware check further comprise:

responsive to determining that a player peripheral associated with one or more of the player settings does not match a user peripheral, identifying one or more similarities between the player peripheral and the user peripheral based on a static mapping; and removing one or more keybindings associated with the player peripheral which do not correspond to the identified similarities from the player settings.

18. The computer program product of claim 15, wherein the program step to overwrite is based on one or more user interface preferences, and wherein the user interface preferences are based on user keybindings from a plurality of games of a same genre on a user device.

19. The computer program product of claim 15, wherein the command is received responsive to a user interacting with a button in a multiplayer gaming platform or a streaming platform.

20. The computer program product of claim 15, wherein the program step to overwrite is based on one or more user settings preferences.

* * * * *